United States Patent [19]

Tsai

[11] Patent Number: 5,522,527
[45] Date of Patent: Jun. 4, 1996

[54] BEVERAGE CONTAINER FIXING DEVICE FOR BICYCLE

[76] Inventor: Richard Tsai, No. 183, Sec. 1, Yuanlu Rd., Fuhsin Hsiang, Changhua Hsien, Taiwan

[21] Appl. No.: 336,868

[22] Filed: Nov. 9, 1994

[51] Int. Cl.⁶ ............................. B62J 11/00; B62J 29/00
[52] U.S. Cl. ..................... 224/414; 224/926; 224/416; 224/420; 224/425; 224/432; 224/448; 224/454; 224/558
[58] Field of Search ................... 224/30 R, 31, 224/33 R, 33 A, 36, 39, 40, 41, 558, 926

[56] References Cited

U.S. PATENT DOCUMENTS

| | | | |
|---|---|---|---|
| 4,312,465 | 1/1982 | Sinkhorn et al. | 224/36 |
| 4,887,784 | 12/1989 | Kayali | 248/311.2 |
| 4,974,759 | 12/1990 | McDonough | 224/31 |
| 4,984,722 | 1/1991 | Moore | 224/558 |
| 5,114,060 | 5/1992 | Boyer | 224/36 |
| 5,328,143 | 7/1994 | Koorey et al. | 224/926 |
| 5,390,836 | 2/1995 | Faulds | 224/926 |

FOREIGN PATENT DOCUMENTS

| | | | |
|---|---|---|---|
| 216262 | 5/1924 | United Kingdom | 224/30 R |

*Primary Examiner*—Henry J. Recla
*Assistant Examiner*—Charles R. Eloshway
*Attorney, Agent, or Firm*—William E. Pelton

[57] ABSTRACT

A beverage container fixing device for a bicycle includes a horizontal base member for supporting a beverage container, a vertical side plate having a lower end portion pivotally engaged with the first end portion of the base member, a bracket pivotally engaged with an upper end portion of the side plate and defining an opening therein for receiving the beverage container therein, a fastener member rotatably mounted on the side plate and defining a fixing compartment therethrough for fixedly receiving one of the horizontal handlebar, top tube and seat tube therein.

8 Claims, 5 Drawing Sheets

5,522,527

BEVERAGE CONTAINER FIXING DEVICE FOR BICYCLE

BACKGROUND OF THE INVENTION

1. Field of Invention

The present invention relates to a beverage container fixing device, and more particularly to a beverage container fixing device for a bicycle and the like.

2. Related Prior Art

A conventional beverage container fixing device for a bicycle is shown in FIG. 6. However, by such an arrangement, there are still some shortcomings in the conventional fixing device.

There will be a more complete and sufficient illustration in the detailed description of the preferred embodiments, concerning the conventional fixing device.

The present invention has arisen to mitigate and/or obviate the above-mentioned disadvantages of the conventional beverage container fixing device.

SUMMARY OF THE INVENTION

The primary objective of the present invention is to provide a beverage container fixing device which does not occupy much space of a bicycle.

In accordance with one aspect of the present invention, there is provided a beverage container fixing device for a bicycle which comprises a horizontal handlebar, a top tube and a seat tube, the beverage container fixing device comprising a horizontal base member which is provided for supporting a beverage container and includes a first end portion and a second end portion, a vertical side plate having a lower end portion pivotally engaged with the first end portion of the base member and an upper end portion, a bracket pivotally engaged with the upper end portion of the side plate and defining an opening therein for receiving the beverage container therein, a fastener member rotatably mounted on the side plate and defining a fixing compartment therethrough for fixedly receiving one of the horizontal handlebar, top tube and seat tube therein.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 6:
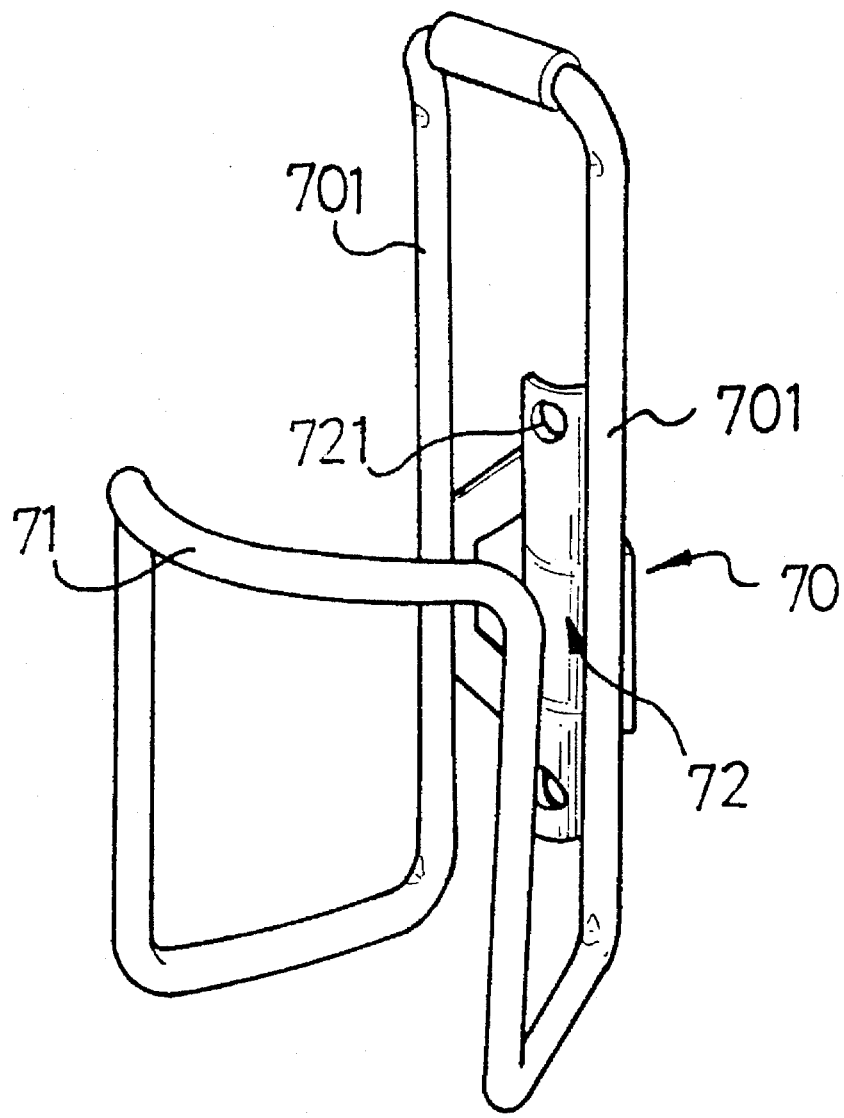
FIG. 6 is a perspective view of a beverage container fixing device for a bicycle in accordance with the prior art.

Referring to FIG. 6, a conventional beverage container fixing device in accordance with the prior art is provided for a bicycle, the fixing device comprising a substantially U-shaped base member 70 having two upstanding parallel legs 701, an engaging member 72 mounted between the two legs 701 of the base member 70, a pair of holes 721 each defined through a corresponding one of the distal ends of the engaging member 72 so as to securely fit the engaging member 72 on one tube (not shown) of the bicycle by bolts (not shown), a substantially U-shaped arcuate bracket 71 extending from the two legs 701 of the base member 70 for supporting a beverage container (not shown). By such an arrangement, the fixing device is limited to be fitted on a seat tube or down tube (not shown) of the bicycle. When the fixing device is mounted on a top tube (not shown) or a handlebar of the bicycle, then the beverage container is disposed along a horizontal direction thereof such that the beverage is easily tilted to be released from the container when being opened. In addition, the beverage container supported by the bracket 71 in such a manner is not stable, so easily being detached from the bracket 71 of the fixing device.

Figure 1:
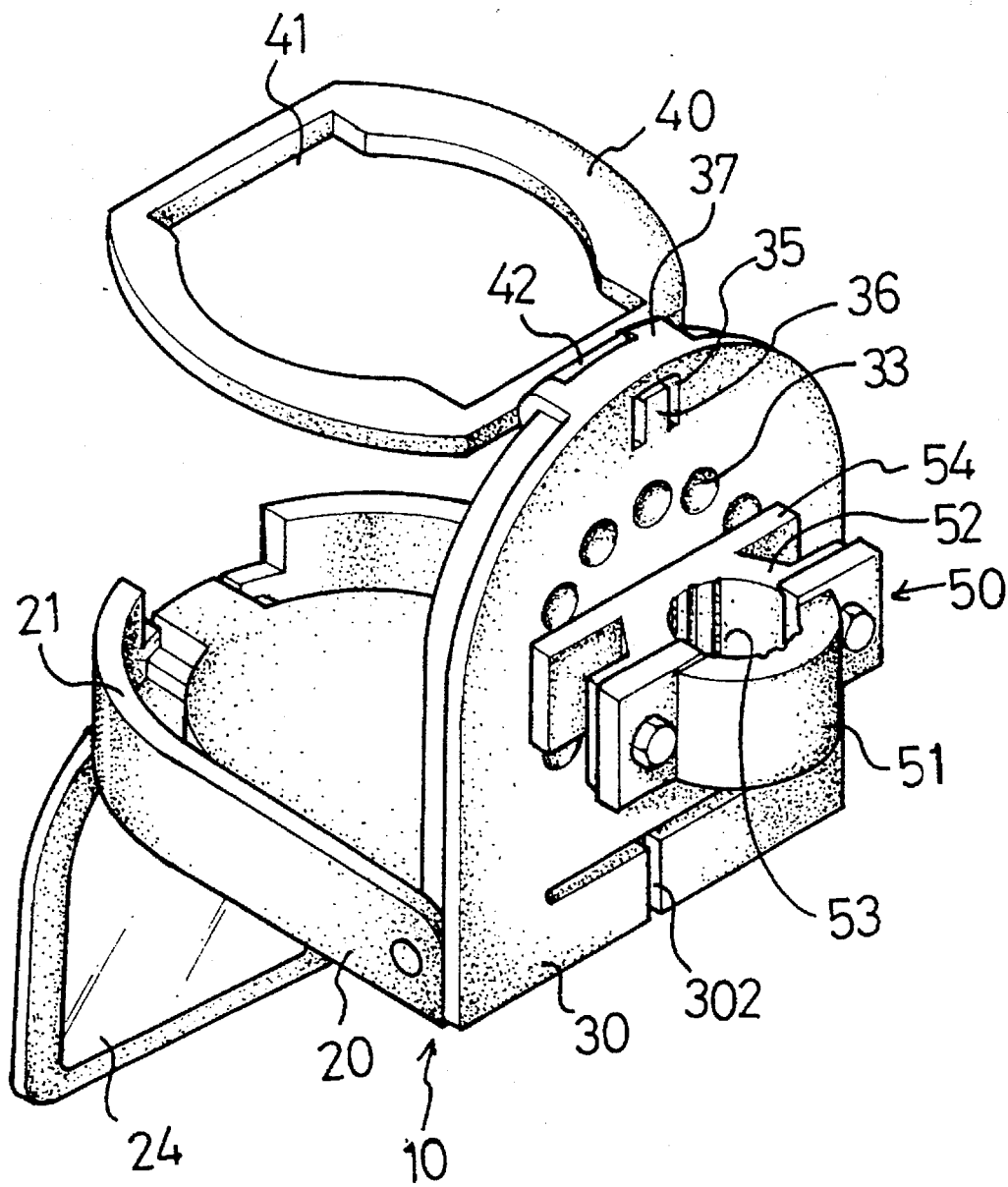
FIG. 1 is a perspective view of a beverage container fixing device for a bicycle in accordance with the present invention.
Figure 2:
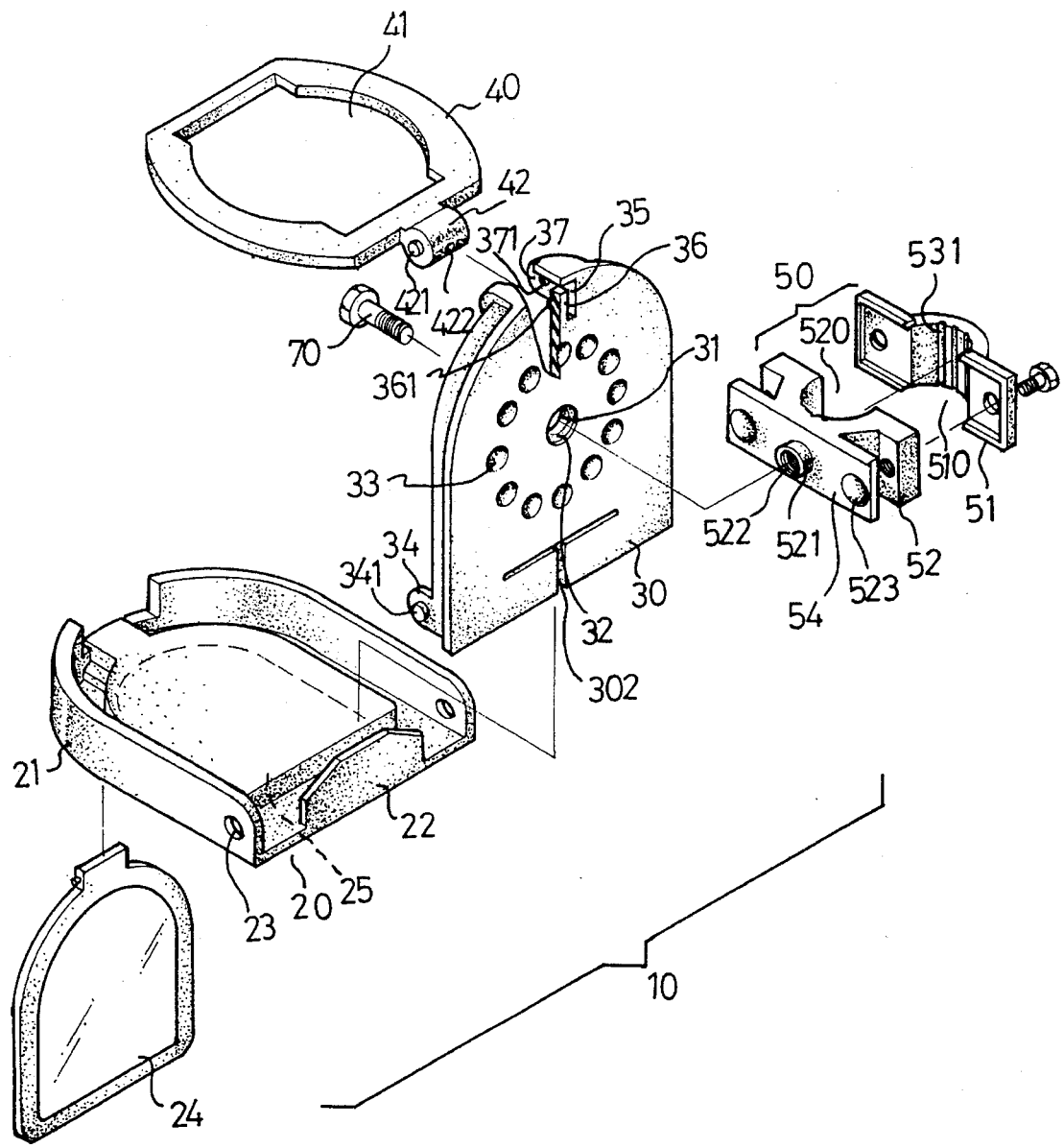
FIG. 2 is an exploded view of the fixing device as shown in FIG. 1.

Referring to FIGS. 1–5, and initially to FIGS. 1 and 2, a beverage container fixing device 10 in accordance with the present invention is provided for a bicycle which comprises a horizontal handlebar 63 (FIG. 5), a top tube 61 and a seat tube 60 (FIG. 4), the beverage container fixing device 10 comprising a horizontal base member 20 which is provided for supporting a beverage container (not shown in FIG. 1) and includes a first end portion and a second end portion, a vertical side plate 30 having a lower end portion pivotally engaged with the first end portion of the base member 20 and an upper end portion, a bracket 40 pivotally engaged with the upper end portion of the side plate 30 and defining an opening 41 therein for receiving the beverage container therein, a fastener member 50 rotatably mounted on the side plate 30 and defining a fixing compartment 53 therethrough for fixedly receiving one of the horizontal handlebar 63, top tube 61 and seat tube 60 therein, a socket 25 (see FIG. 5) defined in an underside of the base member 20, a mirror base 24 pivotally mounted on the underside of the base member 20 is flush with and received in the socket 25.

Figure 3:
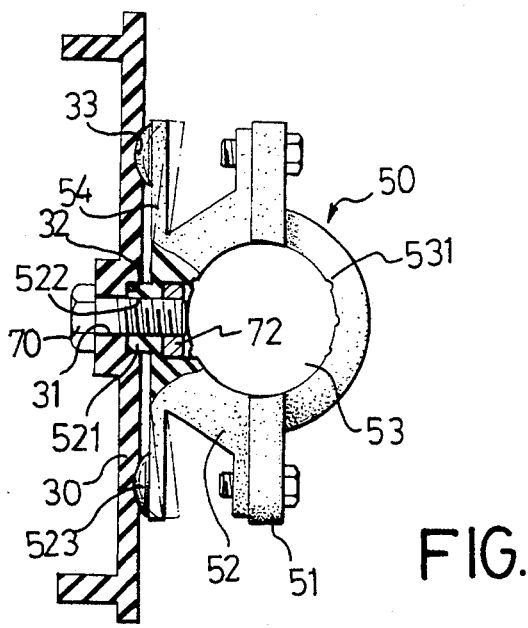
FIG. 3 is a top plan partially cross-sectional assembly view of the fixing device.

Referring to FIGS. 2 and 3, the fastener member 50 comprises a first half 51 and a second half 52 which are coupled together, each of the first and second halves 51 and 52 respectively defining therein first and second semicircular recesses 510 and 520 which communicate with each other, thereby defining the fixing compartment 53, a plurality of grooves 531 longitudinally defined in the fixing compartment 53 for increasing frictional force and grasping action of the fastener member (50). A bore 31 is horizontally defined in a mediate portion of the side plate 30, a counterbore 32 being defined in the side plate 30 and communicating with the horizontal bore 31 and having a diameter greater than that of the horizontal bore 31, the fastener member 50 further comprising a resilient member 54 formed on the second half 52 thereof, a lug portion 521 laterally protruding from a mediate portion of the resilient member 54 and being received in the counterbore 32 of the side plate 30, a threaded hole 522 being defined through the lug portion 521 and communicating with the second recess 520 of the second half 52, a bolt 70 extending through the bore 31 of the side plate 30, threadedly fitted in the threaded hole 522 of the lug portion 521 and threadedly engaged with a nut 72 such that the fastener member 50 is rotatable on the side plate 30. A plurality of pairs of circular depressions 33 are concentrically mounted in the side plate 30 and centered at the counterbore 32, each pair of the circular depressions 33 being diametrically opposite to each other with an equal distance to the counterbore 32, a pair of circular bosses 523 each respectively formed on a corresponding one of the distal ends of the resilient member 54, the pair of bosses 523 aligning with and received in a corresponding one pair of the plurality pairs of depressions 33.

Referring to FIG. 2, a pair of projecting ears 37 are formed on and protrude from the upper end portion of the side plate 30, a hole 371 being defined in each of the projecting ears 37, a pivot member 42 formed on and protruding from a distal end of the bracket 40 and received between the pair of projecting ears 37, a pair of stubs 421 laterally formed on and oppositely protruding from the pivot member 42 and each respectively received in a corresponding one of the holes 371 such that the bracket 40 is able to pivot with the upper end portion of the side plate 30. A substantially U-shaped slot 35 is defined in the upper end portion of the side plate 30, thereby forming a resilient strip 36 which abuts against the pivot member 42 of the bracket 40, a projection 361 protruding from the resilient strip 36 and facing towards the bracket 40, a cavity 422 defined in the pivot member 42 of the bracket 40, whereby, when the bracket 40 is pivoted with the side plate 30 to a horizontal position, the projection 361 of the resilient strip 36 is received in the cavity 422 of the pivot member 42, thereby retaining the bracket 40 in a horizontal status.

Referring to FIG. 2, the base member 20 comprises two substantially parallel side walls 21 each having a first end portion and a second end portion, a pair of holes 23 each respectively defined through the first end portion of a corresponding one of the side walls 21 and each aligning with each other, a stop 22 vertically formed on the first end portion of the base member 20 between the holes 23 of the side walls 21 and abutting against the lower end portion of the side wall 30, thereby retaining the base member 20 in a perpendicular status with the side plate 30, a pair of projecting ears 34 each respectively protruding from a corresponding one of the distal ends of the lower end portion of the side plate 30, a pair of stubs 341 each laterally and oppositely protruding from a corresponding one of the projecting ears 34 and each received in the hole 23 of a corresponding one of the side walls 21 such that the base member 20 is pivotably engaged with the side plate 30, a substantially T-shaped slot 302 defined through the lower end portion of the side plate 30 and adjacent to the vertical stop 22 of the base member 20, when the base member 20 is forced to move upwardly, the stop 22 is able to penetrate through the T-shaped slot 302 such that the base member 20 is pivoted about the side plate 30, thereby folding the base member 20 on the side plate 30.

Figure 4:
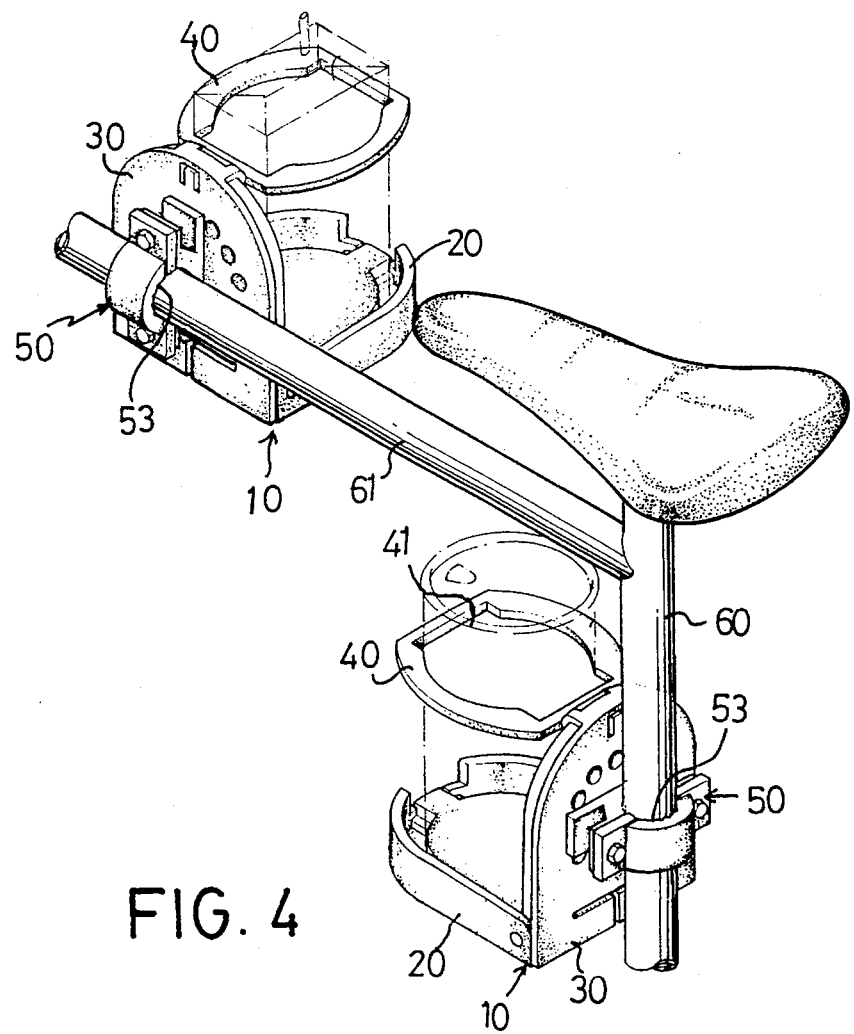
FIG. 4 is an operational view showing the fixing device being mounted on a bicycle.
Figure 5:
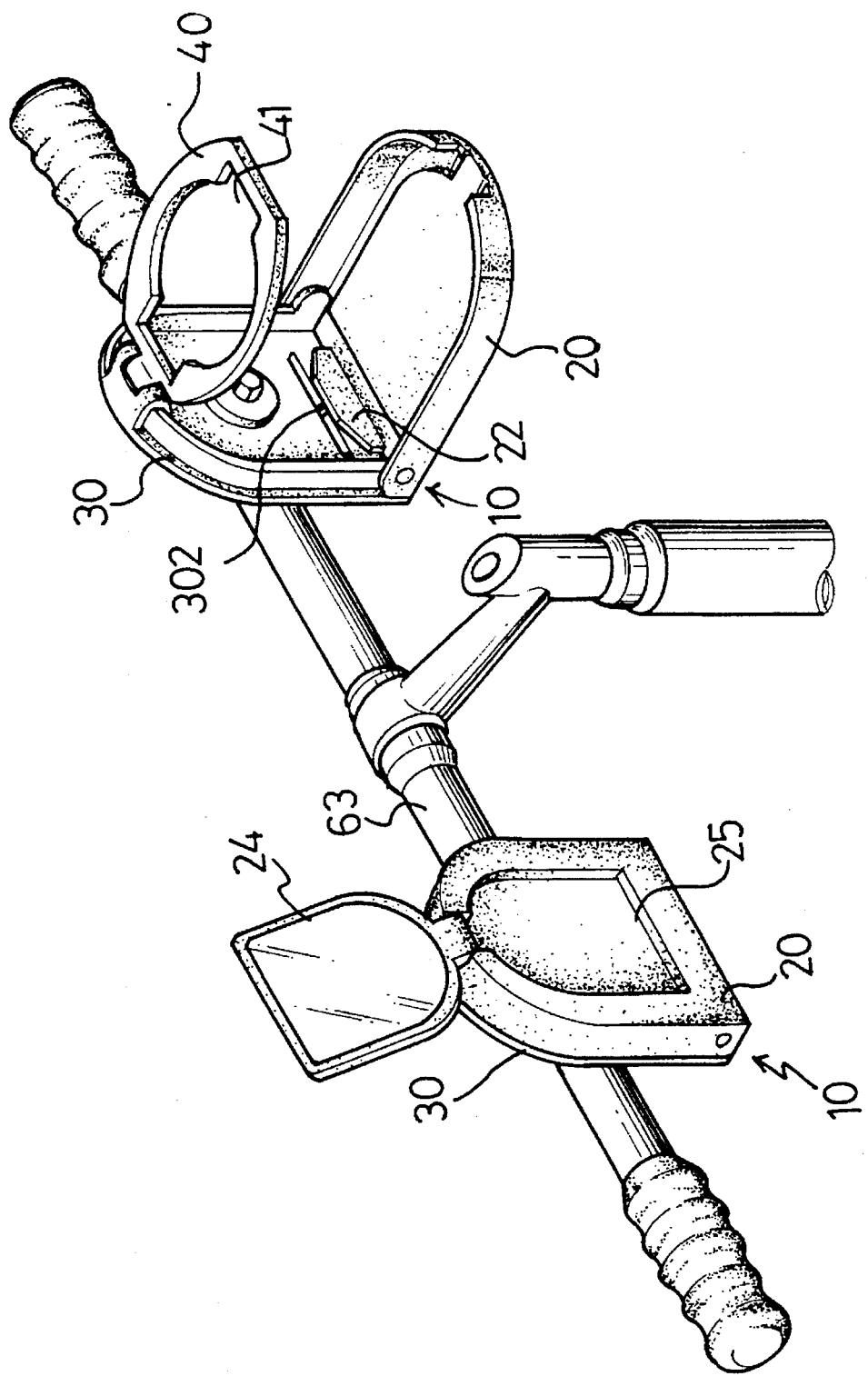
FIG. 5 is an operational view showing the fixing device in a fully extended or folded status.

In operation, referring to FIGS. 4, the fastener member 50 is able to be rotated on the side plate 30 to a position where the compartment 53 is retained in a horizontal direction, thereby securely mounting the fastener member 50 on the top tube 61 of the bicycle such that a beverage container (in phantom lines) is vertically supported by the base member 20 and the bracket 40 without tilting. Alternatively, the fastener member 50 is rotated on the side plate 30 to a position where the compartment 53 is retained in a vertical direction, thereby securely mounting the fastener member 50 on the seat tube 60 of the bicycle such that a beverage container (in phantom lines) is vertically supported by the base member 20 and the bracket 40 without tilting. Referring to FIG. 5, two fixing device 10 are mounted on the handlebar 63 of the bicycle, the compartment 53 each of the fastener members 50 is retained in a horizontal direction, thereby securely mounting each of the fastener members 50 on the handlebar 63 of the bicycle. One of the two fixing devices 10 is in a fully extended status, while the other is in a folded status, i.e., the bracket 40 thereof is pivoted downwardly to be received in the side plate 30, the base member 20 is subsequently pivoted upwardly to cover the side plate 30 while the mirror 24 is pivoted to detach from the socket 25 of the base member 20 for functioning as a sideview mirror.

Accordingly, a fixing device in accordance with the present invention has the following advantages and benefits:

(1) The fastener member is randomly rotatable on the side plate such that the side plate is able to be securely mounted on any tube of the bicycle with the opening of the bracket facing upwardly so as to hold the beverage container in a vertical and stable status without tilting.

(2) The fixing device is able to be folded when not in use, thereby taking up little space of the bicycle.

It should be clear to those skilled in the art that further embodiments of the present invention may be made without departing from the teachings of the present invention.

What is claimed is:

1. A beverage container fixing device for a bicycle which comprises a horizontal handlebar, a top tube and a seat tube, said beverage container fixing device comprising:

a horizontal base member for supporting a beverage container and comprising a first end portion and a second end portion;

a vertical side plate having a lower end portion pivotally engaged with the first end portion of said base member and an upper end portion;

a bracket pivotally engaged with the upper end portion of said side plate and defining an opening therein for receiving said beverage container therein;

a fastener member rotatably mounted on said side plate and defining a fixing compartment therethrough for fixedly receiving one of said horizontal handlebar, top tube, and seat tube; and, a bore horizontally defined in a mediate portion of said side plate, a counterbore defined in said side plate and communicating with said horizontal bore and having a diameter greater than that of said horizontal bore, said fastener member further comprising a resilient member formed on a portion thereof, a lug portion laterally protruding from a mediate portion of said resilient member and being received in said counterbore of said side plate, a threaded hole being defined through said lug portion and communicating with said fixing compartment, and a bolt extending through said bore of said side plate and threadedly fitted in said threaded hole of said lug portion.

2. The fixing device in accordance with claim 1, wherein a plurality of grooves are longitudinally defined in said fixing compartment.

3. The fixing device in accordance with claim 1, wherein said fastener member comprises a first half and a second half which are coupled together, each of said first and second halves respectively defining therein first and second semi-circular recesses which communicate with each other, thereby defining said fixing compartment.

4. The fixing device in accordance with claim 1, wherein a plurality of pairs of circular depressions are concentrically located in said side plate and centered on said counterbore, a pair of circular bosses each respectively formed on a distal end of said resilient member, said pair of bosses capable of aligning with and being received in a corresponding one pair of said plurality of pairs of depressions.

5. The fixing device in accordance with claim 1, wherein a pair of projecting ears are formed on and protrude from the upper end portion of said side plate, a hole being defined in each of said projecting ears, a pivot member formed on and protruding from a distal end of said bracket and received between said pair of projecting ears, a pair of stubs laterally formed on and oppositely protruding from said pivot member and each respectively received in a corresponding one of said holes such that said bracket is able to pivot with respect to the upper end portion of said side plate.

6. The fixing device in accordance with claim 5, wherein a substantially U-shaped slot is defined in the upper end portion of said side plate, thereby forming a resilient strip which abuts against said pivot member of said bracket, a projection protruding from said resilient strip and facing towards said bracket, a cavity defined in said pivot member of said bracket, whereby, when said bracket is pivoted with said side plate to a horizontal position, said projection of said resilient strip is received in said cavity of said pivot member, thereby retaining said bracket in a horizontal position.

7. A beverage container fixing device for a bicycle which comprises a horizontal handlebar, a top tube and a seat tube, said beverage container fixing device comprising:

a horizontal base member for supporting a beverage container and comprising a first end portion and a second end portion;

a vertical side plate having a lower end portion pivotally engaged with the first end portion of said base member and an upper end portion;

a bracket pivotally engaged with the upper end portion of said side plate and defining an opening therein for receiving said beverage container therein;

a fastener member rotatably mounted on said side plate and defining a fixing compartment therethrough for fixedly receiving one of said horizontal handlebar, top tube, and seat tube; and, wherein said base member comprises two parallel side walls each having a first end portion and a second end portion, a pair of holes each respectively defined through the first end portion of a corresponding one of said side walls and axially aligning with each other, a stop vertically formed on the first end portion of said base member between said holes of said side walls and abutting against the lower end portion of said side plate, a pair of projecting ears each respectively protruding from a corresponding one of said projecting ears and each received in said hole of a corresponding one of said side walls such that said base member is pivotably engaged with said side plate, and a substantially T-shaped slot defined through the lower end portion of said side plate and adjacent to said vertical stop of said base member for allowing said stop to penetrate therethrough when said base member is folded onto said side plate.

8. A beverage container fixing device for a bicycle which comprises a horizontal handlebar, a top tube and a seat tube, said beverage container fixing device comprising:

a horizontal base member for supporting a beverage container and comprising a first end portion and a second end portion;

a vertical side plate having a lower end portion pivotally engaged with the first end portion of said base member and an upper end portion;

a bracket pivotally engaged with the upper end portion of said side plate and defining an opening therein for receiving said beverage container therein;

a fastener member rotatably mounted on said side plate and defining a fixing compartment therethrough for fixedly receiving one of said horizontal handlebar, top tube, and seat tube; and, wherein a socket is defined in an underside of said base member, the fixing device further comprising a mirror base which is pivotally mounted on the underside of said base member and is flush with and received in said socket.

* * * * *